United States Patent [19]
Butcher

[11] 3,715,310

[45] Feb. 6, 1973

[54] FIRE-RETARDANT COMPOSITIONS

[75] Inventor: Edward Peter Butcher, Birmingham, England

[73] Assignee: Bakelite Xylonite Limited, London, England

[22] Filed: July 17, 1968

[21] Appl. No.: 745,388

[52] U.S. Cl. ............... 252/8.1, 106/15 FP, 117/136, 161/215, 252/404, 260/30.6
[51] Int. Cl. .............................................. C09k 3/28
[58] Field of Search...260/880, 863, 865, 45.45, 866, 260/45.7 P, 30.6, 45.75, 45.95, 45.75 R, 45.75 P, DIG. 24, 2.5 FP, 2.5 AJ, 30.6 R, 869, 29.6 MP; 252/8.1, 404, 2-5; 106/15 FP, 177; 117/136, 137

[56] References Cited

UNITED STATES PATENTS

| | | | |
|---|---|---|---|
| 3,164,558 | 1/1965 | Eichhorn | 260/45.7 R |
| 3,262,894 | 7/1966 | Green | 260/45.7 R |
| 3,516,959 | 6/1970 | Jonas | 260/28 |
| 2,893,881 | 7/1959 | Sakornbut | 106/15 |
| 3,058,928 | 10/1962 | Eichhorn et al. | 260/2.5 |
| 3,075,940 | 1/1963 | Pazinski et al. | 260/30.6 |
| 3,331,797 | 7/1967 | Kopetz et al. | 260/45.75 |
| 3,409,571 | 11/1968 | Shepard et al. | 260/17.2 |
| 3,206,494 | 9/1965 | Lund et al. | 252/8.1 X |
| 3,210,442 | 10/1965 | Lundberg et al. | 252/8.1 X |
| 1,985,771 | 12/1934 | Eichengrün | 117/128.4 |
| 2,676,927 | 4/1954 | McCurdy et al. | 260/45.7 R |

OTHER PUBLICATIONS

Anon., Modern Plastics Encyclopedia, McGraw-Hill, New York (1966) pp. 451–455 relied on.

*Primary Examiner*—Robert F. Burnett
*Assistant Examiner*—M. E. McCamish
*Attorney*—Paul A. Rose, A. J. Cozzi and G. A. Skoler

[57] ABSTRACT

A fire-retardant composition comprising (a) a halogen-substituted aromatic hydroxy compound and (b) a phosphorus- or antimony-containing compound, for instance, a bromo-phenol and an aromatic phosphate, is especially well suited for incorporation, conveniently in a resin varnish, into laminates.

The resulting laminates are particularly useful for electrical applications.

3 Claims, No Drawings

FIRE-RETARDANT COMPOSITIONS

This invention relates to fire-retardant compositions, and to products containing them. More particularly, it is concerned with fire-retardant compositions which are especially well suited for use in conjunction with synthetic resins, in the manufacture of laminated plastics materials having improved fire-retardant and flame-resistance properties.

Laminated plastics comprising filler materials treated and bonded together by heat and pressure, with synthetic resins in the form of varnishes have been known for many years. Most commonly, the fillers are fibrous in nature, for example, paper, cotton, rayon, asbestos or glass. As for the resins, generally these are thermosetting resins, and examples include epoxy or polyester type resins, urea/formaldehyde condensation products, melamine/formaldehyde condensation products or the condensation products of phenolic compounds and aldehydes (phenol-aldehyde type resins). These reinforced materials are made extensively in the form of decorative laminates, typically comprising a core of several laminated paper sheets impregnated with a thermosetting resin, for example, a phenolic type resin, and one or more paper overlay sheets impregnated with a melamine resin and bearing a decorative effect. Again, such reinforced materials are extensively produced for electrical applications, in which event they often include a surface conductive layer, say a copper sheet, so that the metallic surface of the resulting layer can be partially etched, and the etched material used for printed circuitry.

Laminates of these, and other types have been made and used extensively in a wide range of applications. Of recent years, the property requirements demanded of these laminates have become more severe. In this context, it has become increasingly important for many applications to improve the fire-retardant and flame-resistance properties of the laminates. Conventionally, this is usually achieved by incorporating a suitable fire-retardant, and numerous materials have been proposed for this purpose. In many instances, however, the fire-retardant, whilst improving the fire-retardance and flame-resistance, impairs other desirable properties such, for example, as the dielectric constant, power factor, water absorption and punching properties, which are especially important in laminates intended for electrical applications. For this, and similar reasons, there is a need for a fire-retardant which is capable of improving the fire-retardant and flame-resistance properties of laminates with the minimum deleterious effect on other properties that may be important for a particular application. It is, therefore, an object of the present invention to provide fire-retardant compositions which, when incorporated in laminates, more closely meet this desideratum.

Fire-retardant composition

The fire-retardant composition provided by this invention comprises in its most general sense (a) a halogen-substituted aromatic hydroxy compound and (b) a phosphorus and/or an antimony containing compound.

When the fire-retardant compositions are intended for incorporation into laminates, it is important that the fire-retardant properties of the individual compounds (a) and (b) are not destroyed by the heat treatment employed in making the laminates, so that obviously the compounds must be chosen with this in mind. In the case of a laminate made with a phenolaldehyde type resin, this heat treatment usually involves a temperature of around 150°–170°C, and the compounds (a) and (b) must, therefore, be such that they retain their fire-retardant properties when heated at a temperature within this range for a period of at least 1 hour. Further, it is preferred that both the aromatic hydroxy compounds and the phosphorus-or antimony-containing compounds are soluble in solvents such as alcohols like methanol, toluene, or xylene, especially alcohols.

The preferred class of halogen-substituted aromatic hydroxy compounds (a) is bromo-substituted phenols, for these bromine-containing compounds are more effective than corresponding compounds containing chlorine as the only halogen. Ordinarily, the phenols containing larger amounts of bromine are more efficient fire-retardants than those containing smaller amounts of bromine and, for this reason, the preferred bromo-substituted phenols are compounds such as a tribromophenol and a tetrabromobisphenol A of the following formulas respectively:

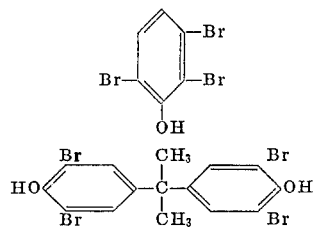

Examples of other suitable bromo-substituted phenols that may be used in the fire-retardant compositions of this invention include ortho-bromophenol, para-bromophenol or mixtures of ortho- and para-bromophenol, a dibromophenol, mixtures of a bromophenol and a dibromophenol, pentabromo p-phenyl phenol, and bromocresol. Though chloro-substituted phenols are generally interior in their fire-retarding properties than the corresponding bromo compounds they are still effective, and examples of suitable chloro-substituted phenols include ortho-chlorophenol, para-chlorophenol, or mixtures of ortho and para-chloro-phenol, a dichlorophenol, mixtures of a chlorophenol and a dichlorophenol, pentachloro p-phenyl phenol and chlorocresol. With regard to the phosphorus- or antimony-containing compound (b) of the fire-retardant compositions, the antimony compound is preferably antimony trioxide. Ordinarily, those phosphorus compounds containing larger amounts of phosphorus are more efficient fire-retardants than those containing small amounts of phosphorus. Examples of suitable phosphates include tri-isooctyl phosphate, tris ethyl hexyl phosphate, triphenyl phosphate, tricresyl phosphate and trixylenyl phosphate. Aromatic phosphates, being generally less polar and having better plasticizing properties are usually preferred to aliphatic phosphates, especially when the compositions are to be used in the manufacture of laminates intended for electrical applications. The preferred phosphorus compound is trixylenyl phosphate.

The preferred fire-retardant compositions according to this invention are those comprising a mixture of tetrabromo bisphenol A and trixylenyl phosphate. The bromo- and chloro-substituted phenols as well as the phosphates suitable for use in this invention are readily prepared by standard procedures, and many are commercially available.

The combination, in the fire-retardant compositions of this invention, of a halogen-containing aromatic hydroxy compound, preferably a bromo-substituted phenol, and the phosphorus- or antimony-containing compound, preferably an aromatic phosphate, such as trixylenyl phosphate, or antimony trioxide, provides a fire-retardant composition which, when used in the manufacture of laminates, produces results which are significantly better than would be expected from an examination of the results which are obtained by the use of either of compounds (a) and (b) alone, or a compound containing both bromine and phosphorus or antimony in the same molecule. With reference to the fire-retardant and flame-resistance properties, with the combination, for instance, tetrabromo bisphenol A and trixylenyl phosphate, a synergistic effect comes into play and these properties are markedly superior to those obtained from the equivalent quantity of the components used individually.

Best results are obtained when the compounds (a) and (b) of the fire-retardant compositions are present in amounts such that the bromine :phosphorus ratio is in the range 2:1 to 30:1, preferably 4:1 to 15:1. Accordingly, the content on a weight basis of the compounds in the compositions is selected so as to fall within this ratio and depending upon the actual components, may vary from between 40 to 150 parts by weight of the halogen-containing aromatic hydroxy compound, and from 150 to 40 parts by weight of the phosphorus- or antimony-containing compound. When the composition consists of a mixture of tetrabromo bisphenol A and trixylenyl phosphate, advantageously the two components are present in approximately equal parts by weight.

Resin Varnish

The fire-retardant compositions may be used to confer fire-retardant and flame-resistance properties on a variety of materials and articles. However, as previously discussed, the fire-retardant compositions of this invention are especially useful in imparting fire-retardant and flame-resistance properties to laminates. For this purpose they are conveniently incorporated in the laminates by including the compositions in the varnish. This invention, therefore, in another of its aspects provides a varnish composition containing a thermosetting resin, a solvent for the resin, and from about 5 percent to about 80 percent weight, more advantageously from about 25 percent to about 45 percent by weight, based on the weight of resin solids, of the fire-retardant composition in accordance with this invention. Preferably, the thermosetting resin is a phenol-aldehyde type resin. If desired for particular applications, the varnish compositions may include conventional additives such as stabilizers, plasticizers or fillers.

These compositions are particularly advantageous when the fire-retardant composition is also soluble in the solvent for the resin, as then the resin composition is easier to apply and has longer shelf life. The most common solvents for a phenol-aldehyde resin are an alcohol, such as methanol, and a mixture of an alcohol and toluene; antimony trioxide is not soluble in methanol or other resin solvents, and when used has to be distributed to the filler for the laminate, or dispersed, by vigorous mixing, in the resin. For this reason it is highly preferred that component (b) of the fire-retardant composition is a phosphorus-containing compound.

Laminates

In the manufacture of the laminated products which constitutes another aspect of this invention, a filler material is treated with a thermosetting synthetic resin and a fire-retardant composition according to the invention. Conveniently, a varnish composition in which the fire-retardant composition is present, is applied to sheets of the filler material, which may previously have been impregnated with a low molecular weight water soluble resin of the same type. The treated sheets are then dried, partially to evaporate the solvents and partially to cure the resin, a number of such sheets is assembled in a press or mould, and the assembly is subjected to the action of heat and pressure.

While it is generally preferred, for ease of processing, to incorporate the fire-retardant compositions in the laminates by adding them to the varnish, they may be applied in other ways. Thus, they may be included at the resin manufacture stage by adding them along with the resin reactants required for the particular resin. Again, they may be incorporated in a separate operation, simply by treating the filler material, before or after impregnating it with the resin, with a solution of the fire-retardant composition in a convenient solvent, or by coating the fire-retardant composition onto the fibrous material.

This invention, therefore, in a still further aspect, includes a laminate comprising a filler material impregnated with a thermosetting synthetic resin, said laminate containing a fire-retardant composition in accordance with the invention. The filler is preferably a continuous fibrous material such as paper, and the resin is preferably a phenol-aldehyde type resin. When intended for electrical applications, the laminate usually has a surface layer of a metal such as a metal foil, say, copper.

The fire-retardant compositions and, where appropriate, the varnish compositions containing them are particularly useful in the manufacture of laminates intended for electrical applications, because they afford a desirable balance of fire-retardant and electrical properties, notably dielectric constant and power factor. In this connection, the preferred varnish composition is one containing, as the resin, a tung oil modified cresol formaldehyde resin obtained by reacting together cresol, a molecular excess of aqueous formaldehyde and tung oil in the presence of alkali in a solvent such as methanol, and a fire-retardant composition comprising a bromophenol and an aromatic phosphate. These compositions can be used to impregnate electrical grade paper in forming laminates which exhibit a good balance of fire-retardance, electrical and room temperature punching properties.

The invention will now be further described by reference to the following examples. In these examples, in which all parts are parts by weight unless otherwise stated, use is made of specific resins and varnishes containing them as follows:

Resin

The resin used in each of the examples was a tung oil modified cresol formaldehyde resin made by heating a cresol with aqueous formaldehyde in the presence of tung oil and (as a catalyst) ammonia.

Varnish

Each of the varnishes, save when the fire-retardant composition contains an antimony compound (antimony trioxide), is prepared by dissolving the desired quantity of the particular fire-retardant composition in a 47 percent (unless otherwise stated) solution of the resin in methanol or a methanol/toluene mixture. The antimony trioxide-containing fire-retardant compositions are suspended in the resin solution by vigorous agitation. The concentration of the fire-retardant compositions in each of the examples is based on the solids content of the resin varnish.

The fire-retardants are designated in the examples as follows:

A — equal parts of tetrabromo bisphenol A and trixylenyl phosphate with a Br content of 4.7 percent and a P content of 0.6 percent (Br:P = 7.8:1);

B — 5 parts of tetrabromo bisphenol A and 5 parts trixylenyl phosphate with a Br content of 2.4 percent and a P content of 0.3 percent (Br:P = 8:1);

C — 7.5 parts of tetrabromo bisphenol A and 5 parts trixylenyl phosphate with a Br content of 3.4 percent and a P content of 0.3 percent (Br:P = 11:1);

D — 10 parts of tetrabromo bisphenol A and 5 parts trixylenyl phosphate with a Br content of 3.8 percent and a P content of 0.3 percent (Br:P = 12.5:1);

E — 17 parts of tetrabromo bisphenol A and 11 parts trixylenyl phosphate with a Br content of 7.0 percent and a P content of 0.6 percent (Br:P = 11.5:1);

F — tetrabromo bisphenol A (included for comparative purposes);

G — trixylenyl phosphate (included for comparative purposes);

H — trisdibromopropyl phosphate (included for comparative purposes);

I — 10 parts of tribromophenol and 12½ parts of trixylenyl phosphate with a Br content of 4.8 percent and a P content of 0.63 percent (Br:P = 7.6:1);

J — 7.9 parts of bromocresol and 10.2 parts of trixylenyl phosphate with a Br content of 2.6 percent and a P content of 0.6 percent (Br:P = 4.3:1);

K — 17 parts of a mixture of ortho- and para-bromophenol and 11 parts of trixylenyl phosphate with a Br content of 5.5 percent and a P content of 0.6 percent (Br:P = 9.1:1);

L — 17 parts of a mixture of ortho- and para-bromophenol and 2.8 parts of trixylenyl phosphate with a Br content of 5.9 percent and a P content of 0.2 percent (Br:P = 29:1);

M — 7.9 parts of a mixture of 82 percent para-bromophenol and 18 percent 2,4-dibromophenol and 10.2 parts of trixylenyl phosphate with a Br content of 2.8 percent and a P content of 0.6 percent (Br:P = 4.7:1);

N — 5 parts of pentachloro-p-phenylphenol and 5 parts of trixylenyl phosphate with a chlorine content of 2.3 percent and a phosphorus content of 0.3 percent (Cl:P = 7.8:1); and Q — 12.5 parts of tetrabromo bisphenol A and 12.5 parts of antimony trioxide with a bromide content of 4.7 percent and an antimony content of 6.6 percent (Br:Sb = 0.7:1).

Two sorts of laminates were used in the examples, and they were prepared in the following manner:

Laminate X

Electrical grade Kraft paper was pre-impregnated to a resin content of 14 percent with a low molecular weight, water soluble phenol formaldehyde resin made by reacting phenol with a molecular excess of aqueous formaldehyde in the presence of alkali. This pre-impregnated paper was further impregnated with the particular phenolic varnish, and then dried to a total resin content of 53 percent. The treated paper was cut to an appropriate size, and seven plies of it were assembled together, and then heated in a press between stainless steel plates at 170°C for 50 minutes under a pressure of 1,500 p.s.i. The product was cooled for 30 minutes.

Laminate Y

This was a copper clad laminate, prepared following the same procedure as for Laminate X except that copper foil (approx. 305 g. per meter$^2$) coated with a blend of a phenolic resin and polyvinyl butyral as adhesive was located on one surface of the seven ply assembly.

The various tests referred to in these examples in connection with the properties of the laminates, except in the case of the tests referred to in Examples 2 and 3, involved the following standard procedures:

| | |
|---|---|
| Insulation resistance | BS 2782,204A |
| Power factor | BS 2782,207B |
| Electric strength | BS 2572, App F. |
| Water absorption | BS 2076, App E. |
| Punching properties (room temperature) | ASTM test D-617-44 |
| Solvent resistance | 5 mins. exposure to trichloroethylene vapor. |
| Fire retardance | determined by measuring the self-extinguishing time according to BS 3888, 1965, App T. |

EXAMPLE 1

Laminate X was prepared using a varnish containing 100 parts of the resin and 25 parts of the fire-retardant composition A, i.e., 35 percent by weight. This laminate when tested for fire-retardant properties gave a self-extinguishing time of less than 15 seconds as opposed to 90 seconds or more for a comparable product having no fire-retardant incorporated.

EXAMPLE 2

Laminate Y was prepared using the same varnish as in Example 1. Some of the pertinent properties of this copper-clad laminate, and of the paper base material after removal of the copper by etching are reported in Table 1 below.

EXAMPLE 3

Laminate Y was prepared using a varnish containing 100 parts of the resin and 25 parts of the fire-retardant composition Q. Some of its properties are also reported in Table 1 below.

Various properties of each of the laminates were determined, and the results are reported in Table II below:

TABLE I

| Properties of laminate | Units | Test results Ex. 2 | Test results Ex. 3 | Test method |
|---|---|---|---|---|
| Solder float: Unetched specimens, etched specimens | | No blistering, delamination or interlaminar blistering | | NEMA LI 1-10.11, 1965. |
| Peel strength: | | | | |
| After solder float | lbf/in | 8 | 8 | NEMA LI 1-10.12, 1965. |
| After elevated temp | lbf/in | 8 | .8 | NEMA LI 1-10.13, 1965. |
| Volume resistivity after 96 hr. at 35° C. and 80% RH | Megohm cm | $6 \times 10^6$ | $3 \times 10^6$ | ASTM D257. |
| Surface resistance after 96 hr. at 35° C. and 90% RH | Megohms | 70,000 | $2 \times 10^4$ | ASTM D257. |
| Properties of paper base material after removal of copper by etching | | | | |
| Power factor at $10^6$ c./s. after 48 hr. in water at 50° C | Tan δ | 0.040 | 0.040 | ASTM D150. |
| Dielectric constant at $10^6$ c./s. after 18 hr. in water at 50° C | | 4.2 | 4.8 | ASTM D150. |
| Electrical strength (parallel to laminae after 48 hr. in water at 50° C.) | Kv | >50 | >50 | NEMA LI 1-10.16, 1965. |
| Flexural strength: | | | | |
| Lengthwise | lbf/in.² | 19,600 | 18,100 | NEMA LI 1-10.18, 1965. |
| Crosswise | lbf/in.² | 17,000 | 16,300 | |
| Water absorption after 24 hr. at 23° C | Percent | 0.57 | 0.53 | ASTM D229. |
| Self-extinguishing time | Secs | 6 | 5 | ASTM D229. |

The fire-retardant compositions used in Examples 1 to 3 did not adversely affect to any appreciable extent the important electrical and other properties of the resulting laminates, and they did not decompose prematurely during the curing of the laminates. The fire-retardant composition A used in Examples 1 and 2 had the advantage of being soluble in the resin solvent, thus reducing handling problems; the shelf life of the varnish composition was unaffected. The combination of good electrical, cold punching and self-extinguishing properties render the laminates of Examples 2 and 3 particularly suitable for the manufacture of printed circuits and other electrical applications.

EXAMPLE 4

This example demonstrates the effect of varying the amount of the two components of a particular fire-retardant composition and the concentration of the composition in a given resin.

Part a:
Laminate Y was made using a varnish composition comprising a 100 parts of the resin and 25 parts of the fire-retardant composition A, i.e., 35 percent by weight.

Part b:
Laminate Y was made using a varnish composition comprising a 100 parts of the resin and 10 parts of the fire-retardant composition B, i.e., 17.6 percent by weight.

Part c:
Laminate Y was made using a varnish composition comprising a 100 parts of the resin and 12.5 parts of the fire-retardant composition C, i.e., 21 percent by weight.

Part d:
Laminate Y was made using a varnish composition comprising a 100 parts of the resin and 15 parts of the fire-retardant composition D, i.e., 24 percent by weight.

Part e:
Laminate Y was made using a varnish composition comprising a 100 parts of the resin and 28 parts of the fire-retardant composition E, i.e., 43 percent by weight.

TABLE II

| Property | Unit | Part a | b | c | d | e |
|---|---|---|---|---|---|---|
| Insulation resistance | megohms | 128K | 400K | 400K | 400K | 30K |
| Power factor at 800c/s. | tan γ | 0.032 | 0.019 | 0.018 | 0.019 | 0.031 |
| Electric strength | v/mil. | 426 | 440 | 430 | 420 | 270 |
| Water absorption | mg. | 13 | 11 | 11 | 12 | 20 |
| Punching properties (room temperature) | % | 90 | 80 | 80 | 85 | 90 |
| Self-extinguishing time | secs. | 6 | 20 | 20 | 18 | 6 |

The results show that the most favorable balance of fire-retardant, electrical, water absorption and punching properties was obtained with the laminate containing the fire-retardant composition A.

EXAMPLE 5

This example is included for comparative purposes and shows the superior results obtained using a typical fire-retardant composition provided by this invention relative to the results obtained with the compounds of the composition used individually, and a compound containing both bromine and phosphorus in the same molecule.

Part a:
Laminate Y was made using a varnish composition comprising 100 parts of the resin and 12½ parts of fire-retardant F, i.e., tetrabromo bisphenol A, alone (Br content = 4.7 percent);

Part b:
Laminate Y was made using a varnish composition comprising 100 parts of the resin and 25 parts of fire-retardant G, i.e., trixylenyl phosphate, alone (P content = 1.2 percent);

Part c:
Laminate Y was made using a varnish composition comprising 100 parts of the resin and 25 parts of fire-retardant H, i.e., trisdibromo propyl phosphate, alone (Br content = 6 percent and P content = 0.4 percent); and Part d:

Laminate Y was made following the procedure of Example 4, Part a, i.e., it contained 12½ parts of fire-retardant F and 12½ parts of fire-retardant G, (fire-retardant A).

Various properties of each of the laminate were determined, and the results are reported in Table III below:

TABLE III

| Property | Unit | Part a | b | c | d |
|---|---|---|---|---|---|
| Insulation resistance | megohms | 467K | 103K | - | 128K |
| Power factor | tan γ | 0.33 | 0.055 | - | 0.032 |
| Dielectric constant | v/mil | 3.96 | 4.13 | - | 3.90 |
| Water absorption | mg. | 0.8 | 16 | - | 13 |
| Punching properties | % | 75 | 70 | - | 90 |
| Solvent resistance |  | good no mottle | poor severe mottle | - | good no mottle |
| Self-extinguishing time | secs. | 18 | 15 | - | 6 |

These results demonstrate that the laminate containing (as the fire-retardant) solely the bromine compound had relatively poor fire-retardant and cold punching properties, and that the laminate containing solely the phosphorus compound had relatively poor properties in every respect, but especially electrical properties, water absorption and solvent resistance. The firerretardant H (part c) prematurely decomposed during the curing of the laminate which was carbonized, so that it was quite unsuitable for any practical application. Again, the best balance of properties was obtained with the laminate containing the fire-retardant composition A (part d).

EXAMPLE 6

Laminate Y was made using a varnish composition comprising 100 parts of the resin and 22½ parts of the fire-retardant composition I, i.e., 15 percent by weight.

Laminate properties:
Power factor 0.042
Dielectric content 3.80
Water absorption 12
Punching properties 90
Self-extinguishing time 10 seconds.

EXAMPLE 7

Laminate Y was made using a varnish composition comprising 100 parts of the resin (42 percent solution in methanol) and 18.1 parts of the fire-retardant composition J, i.e., 12.8 percent by weight.

Laminate properties:
Power factor 0.036
Water absorption 8
Punching properties 85
Self-extinguishing time 13 seconds.

EXAMPLE 8

Laminate Y was made using a varnish composition comprising 100 parts of the resin (37 percent solution in methanol) and 28 parts of the fire-retardant composition K, i.e., 43 percent by weight:

Laminate properties:
Power factor 0.036
Water absorption 6
Punching properties 90
Self-extinguishing time 14 seconds.

EXAMPLE 9

Laminate Y was made using a varnish composition comprising 100 parts of the resin (40 percent solution in methanol) and 19.8 parts of the fire-retardant composition L, i.e., 33 percent by weight.

Laminate properties:
Power factor 0.024
Water absorption 7
Punching properties 90
Self-extinguishing time 17 seconds.

EXAMPLE 10

Laminate Y was made using a varnish composition comprising 100 parts of the resin and 18.1 parts of the fire-retardant composition M, i.e., 30 percent by weight:

Laminate properties:
Power factor 0.033
Water absorption 8
Punching properties 80
Self-extinguishing time 11 seconds.

EXAMPLE 11

Laminate Y was made using a varnish composition comprising 100 parts of the resin and 10 parts of the fire-retardant composition N, i.e., 8 percent by weight.

Laminate properties:
Power factor 0.020
Water absorption 12
Punching properties 80
Self-extinguishing time 20 seconds.

Although representative embodiments of the invention have been specifically described, it is not intended or desired that the invention be limited solely thereto as it will be apparent to those skilled in the art, that modifications and variations may be made without departing from the spirit and scope of the invention as defined in the appended claims.

What I claim is:

1. A mixture containing as essential ingredients thereof (a) tetrabromo bisphenol A and (b) a compound selected from the group consisting of aliphatic phosphorus-containing compounds, aromatic phosphorus-containing compounds, antimony trioxide, and mixtures thereof, which mixture retains its fire-retardant properties after being heated to a temperature of 150° – 170°C. for about 1 hour.

2. A mixture containing as essential ingredients thereof (a) a compound selected from the group consisting of ortho-bromophenol, para-bromophenol, mixtures of ortho- and para-bromophenol, a dibromophenol, mixtures of a bromophenol and a dibromophenol, tri-bromophenol, pentabromo p-phenyl phenol, bromocresol, and (b) trixylenyl phosphate, which mixture retains its fire-retardant properties after being heated to a temperature of 150° – 170°C. for about 1 hour.

3. A composition according to claim 2 in which (a) is tetrabromo bisphenol A and there is present approximately equal parts by weight of tetrabromo bisphenol A and trixylenyl phosphate.

* * * * *

UNITED STATES PATENT OFFICE
CERTIFICATE OF CORRECTION

Patent No. 3,715,310      Dated February 6, 1973

Inventor(s) Edward Peter Butcher

It is certified that error appears in the above-identified patent and that said Letters Patent are hereby corrected as shown below:

Column 2, line 43, "interior" should read --inferior--.
Column 7, Table I, with respect to Volume Resistivity, "80%" should read --90%--. Column 9, line 34, "firerretardant" should read --fire-retardant--.

Signed and sealed this 12th day of November 1974.

(SEAL)
Attest:

McCOY M. GIBSON JR.
Attesting Officer

C. MARSHALL DANN
Commissioner of Patents